United States Patent

Hodge et al.

(10) Patent No.: US 10,036,432 B2
(45) Date of Patent: Jul. 31, 2018

(54) TRANSMISSION ONE-WAY CLUTCH ASSEMBLY

(71) Applicant: Schaeffler Technologies AG & Co. KG, Herzogenaurach (DE)

(72) Inventors: Michael Hodge, Creston, OH (US); James Copeland, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/458,558

(22) Filed: Mar. 14, 2017

(65) Prior Publication Data

US 2017/0276194 A1 Sep. 28, 2017

Related U.S. Application Data

(60) Provisional application No. 62/311,726, filed on Mar. 22, 2016.

(51) Int. Cl.
*F16D 41/067* (2006.01)

(52) U.S. Cl.
CPC .................. *F16D 41/067* (2013.01)

(58) Field of Classification Search
USPC .................................................... 192/45.006
See application file for complete search history.

(56) References Cited

U.S. PATENT DOCUMENTS

| 2,382,331 | A | * | 8/1945 | Peterson | F16D 41/067 |
| | | | | | 192/45.006 |
| 2,389,961 | A | * | 11/1945 | Dodge | F16D 41/07 |
| | | | | | 192/45.1 |
| 3,031,053 | A | * | 4/1962 | Sauzedde | F16D 41/067 |
| | | | | | 119/57.7 |
| 5,064,037 | A | * | 11/1991 | Long, Jr. | F16D 41/07 |
| | | | | | 192/104 B |
| 9,145,927 | B2 | | 9/2015 | Luipold et al. | |
| 2001/0045334 | A1 | * | 11/2001 | Aida | F16D 41/067 |
| | | | | | 192/45.017 |
| 2012/0227540 | A1 | * | 9/2012 | Steele | F02N 15/022 |
| | | | | | 74/7 C |
| 2013/0213027 | A1 | | 8/2013 | Bird et al. | |
| 2014/0305396 | A1 | * | 10/2014 | Steele | F16D 41/067 |
| | | | | | 123/179.25 |
| 2014/0353110 | A1 | * | 12/2014 | Luipold | F16D 13/58 |
| | | | | | 192/41 R |
| 2015/0148174 | A1 | * | 5/2015 | Nakamura | B60K 1/00 |
| | | | | | 475/149 |
| 2016/0025143 | A1 | | 1/2016 | Hodge | |

* cited by examiner

*Primary Examiner* — Jacob S. Scott
*Assistant Examiner* — Timothy Hannon
(74) *Attorney, Agent, or Firm* — Kevin L. Parks

(57) ABSTRACT

A one-way clutch assembly for a transmission includes a housing and a bearing support plate. The housing has an outer circumferential portion with an undulating spline profile, an inner circumferential portion, and a radial portion connecting the outer and inner circumferential portions. The bearing support plate is fixed to the housing radial portion. In an example embodiment, the inner circumferential portion includes an outer surface including a spline for engaging a transmission component. In an example embodiment, the bearing support plate includes integral rivet posts for fixing to the radial portion.

15 Claims, 8 Drawing Sheets

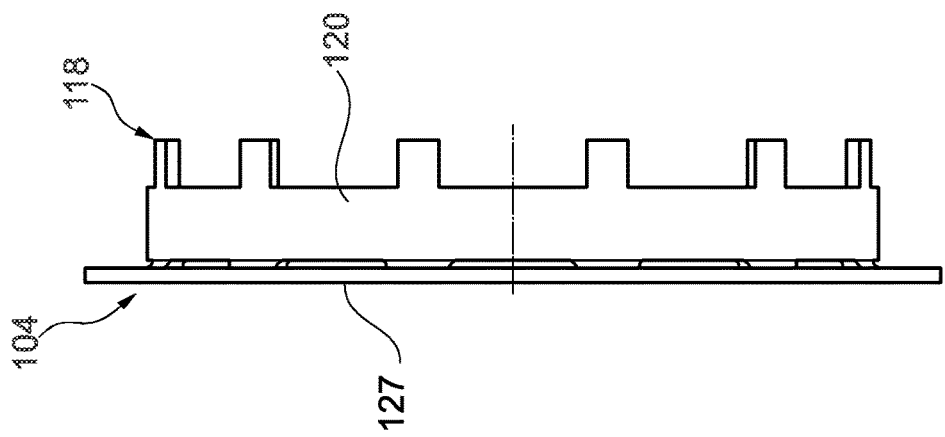
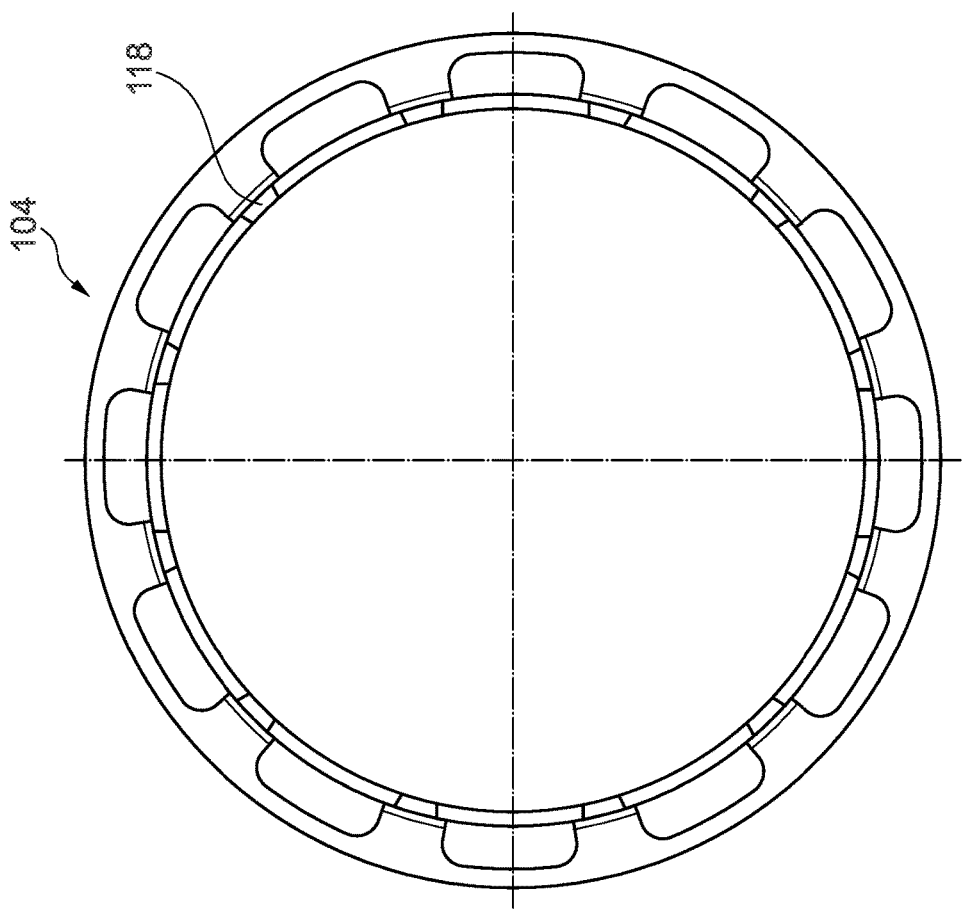

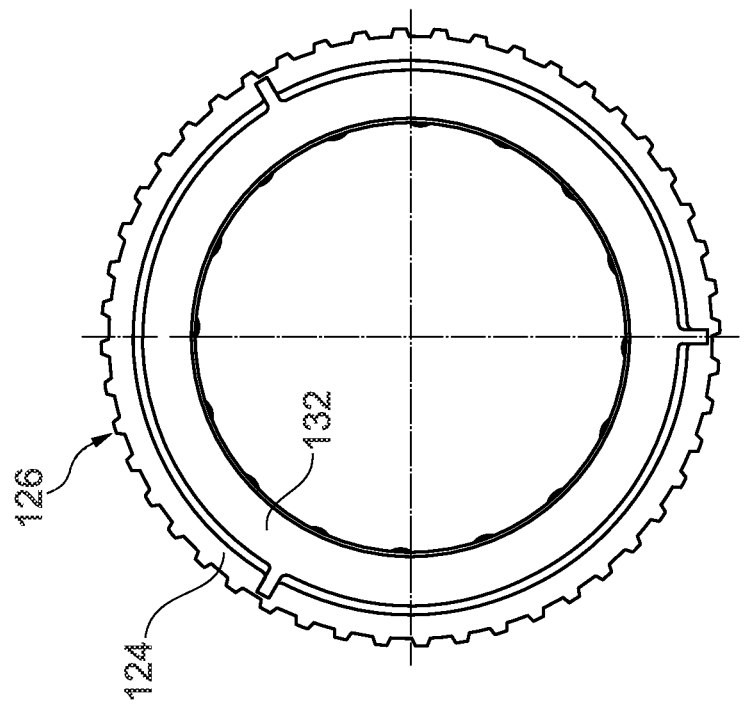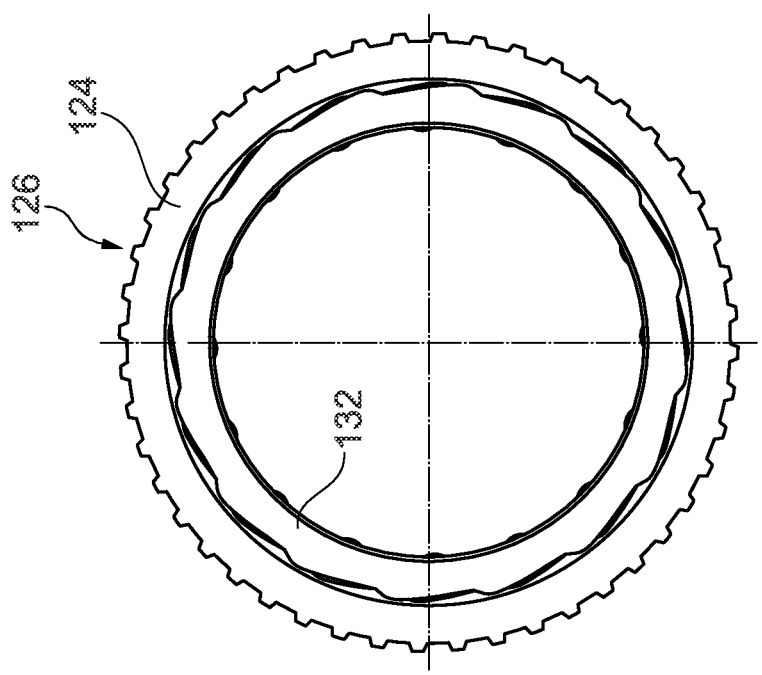

TRANSMISSION ONE-WAY CLUTCH ASSEMBLY

FIELD

The invention relates generally to a one-way clutch, and more specifically to a one-way clutch assembly for a transmission.

BACKGROUND

One-way clutches for transmissions are known. One example is shown in commonly-assigned U.S. Pat. No. 9,145,927.

BRIEF SUMMARY

Example aspects broadly comprise a one-way clutch assembly for a transmission including a housing and a bearing support plate. The housing has an outer circumferential portion with an undulating spline profile, an inner circumferential portion, and a radial portion connecting the outer and inner circumferential portions. The bearing support plate is fixed to the housing radial portion. In an example embodiment, the inner circumferential portion includes an outer surface including a spline for engaging a transmission component. In an example embodiment, the bearing support plate includes integral rivet posts for fixing to the radial portion.

In some example embodiments, the one-way clutch assembly includes an outer race with an outer spline profile engaged with the housing outer circumferential portion. In an example embodiment, the bearing support plate includes a radial wall for axial placement of the outer race in the housing. In some example embodiments, the one-way clutch assembly includes an inner race and a plurality of rollers engaged with the inner and outer races. In an example embodiment, the one-way clutch assembly includes a cage for retaining the rollers and a plurality of springs, each spring being in contact with the cage and one of the rollers. In an example embodiment, the one-way clutch assembly includes a hardened side plate. The inner race includes a radial wall and the side plate is disposed axially between the inner race radial wall and the rollers.

In an example embodiment, the one-way clutch assembly includes an inner race and a bearing disposed radially between the inner race and the bearing support plate. In an example embodiment, the one-way clutch assembly includes an inner race with a cutting spline for press-fitting onto a transmission component.

BRIEF DESCRIPTION OF THE DRAWINGS

The nature and mode of operation of the present invention will now be more fully described in the following detailed description taken with the accompanying drawing figures, in which:

FIG. 4 is a back view of a bearing support plate;

FIG. 5 is a side view of the bearing support plate of FIG. 4;

FIG. 11 is a front view of a cage assembled with an outer race;

FIG. 12 is a back view of the cage and outer race assembly of FIG. 11.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
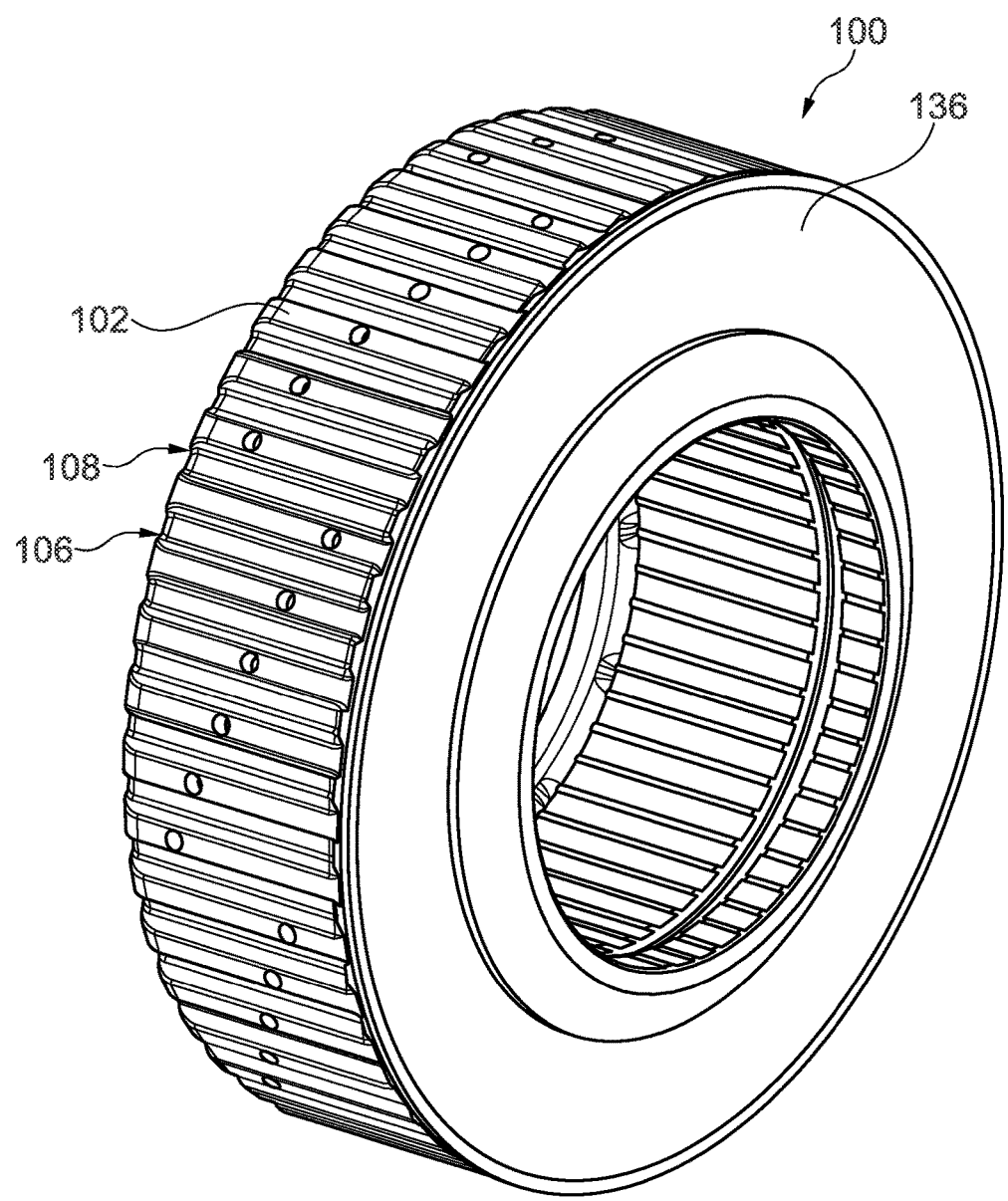
FIG. 1 is a front perspective view of one-way clutch assembly according to an example aspect.
Figure 2:
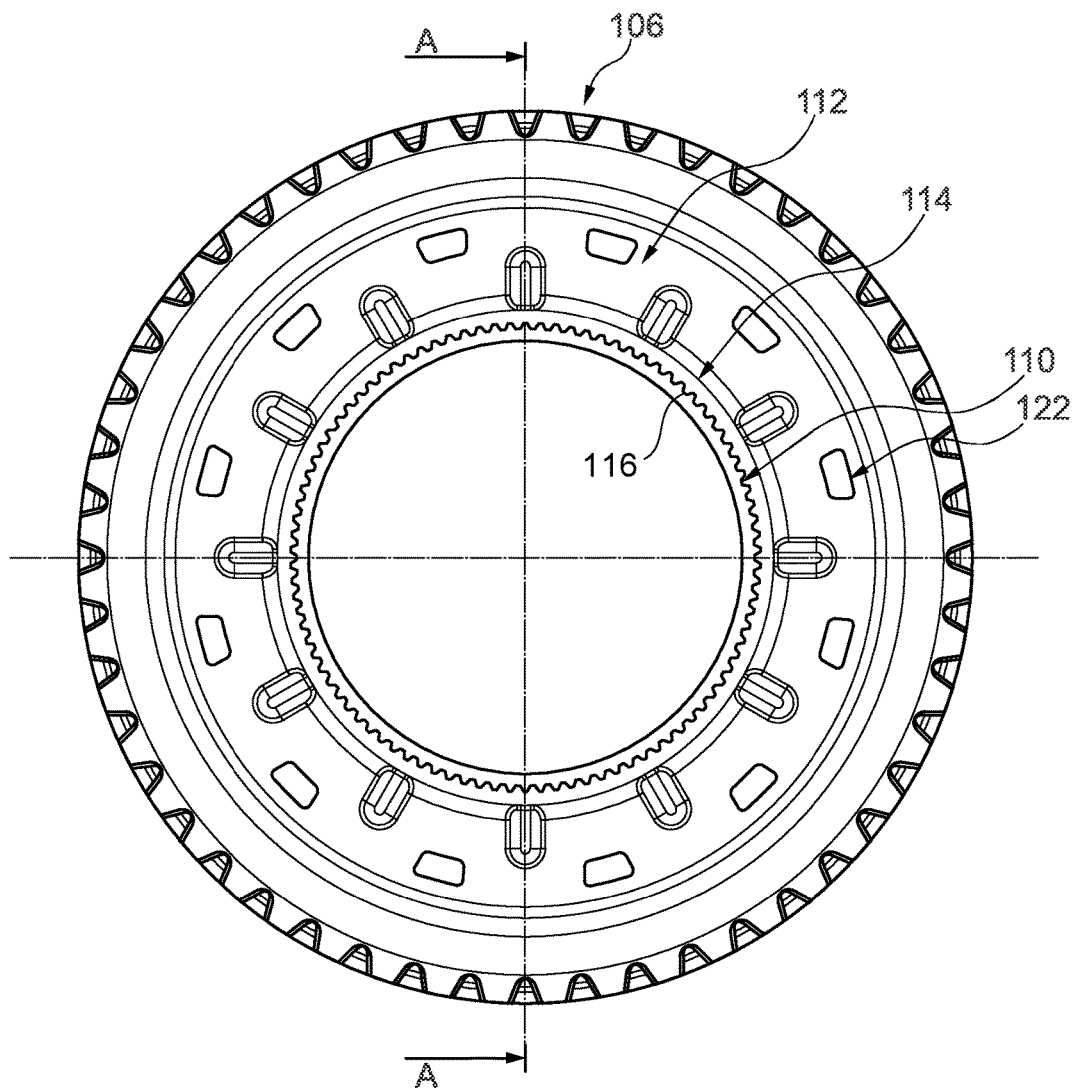
FIG. 2 is a back view of the one-way clutch assembly of FIG. 1.
Figure 3:
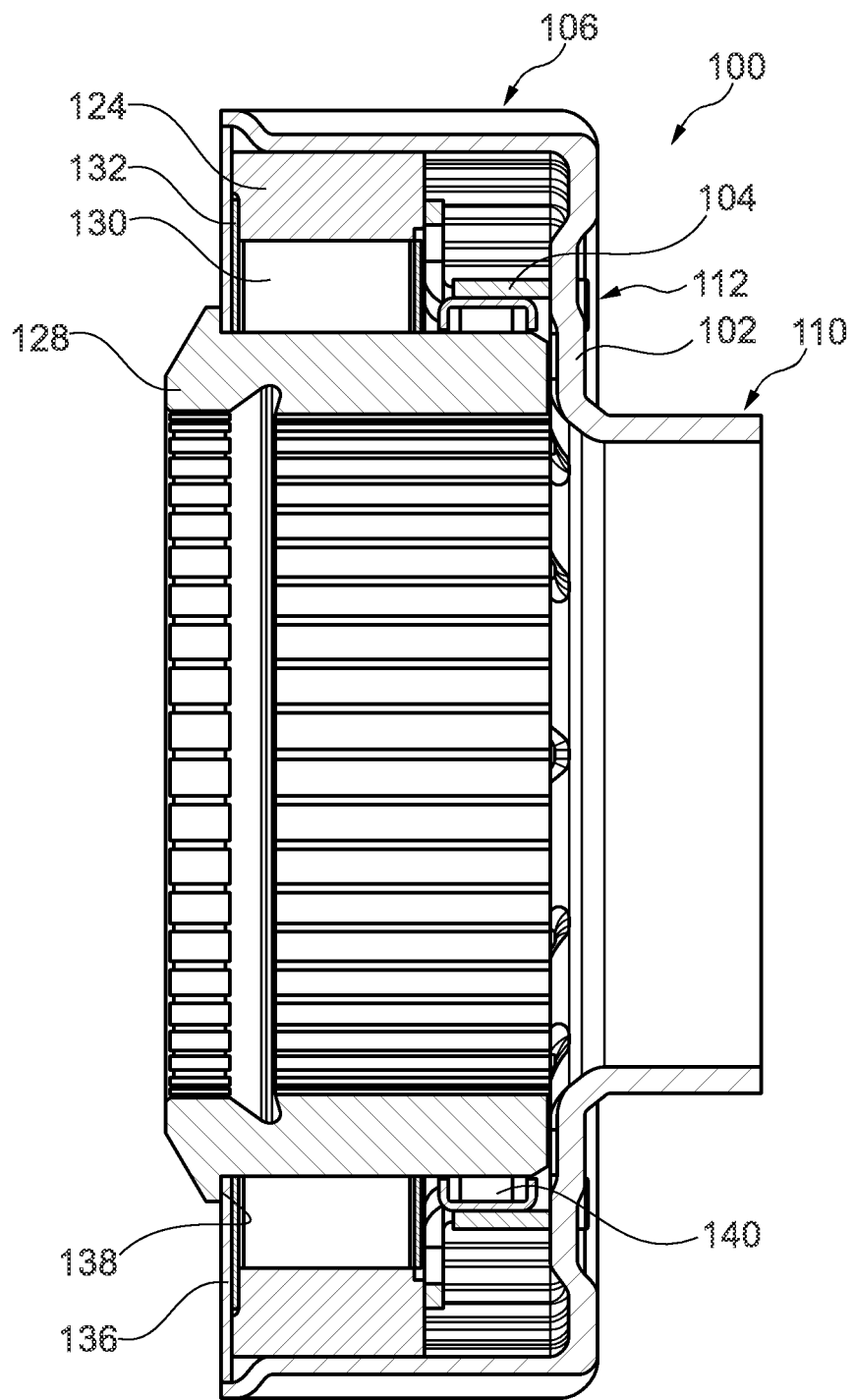
FIG. 3 is a section view of the one-way clutch assembly of FIG. 1 taken generally along line 3-3 in FIG. 2.
Figure 6:
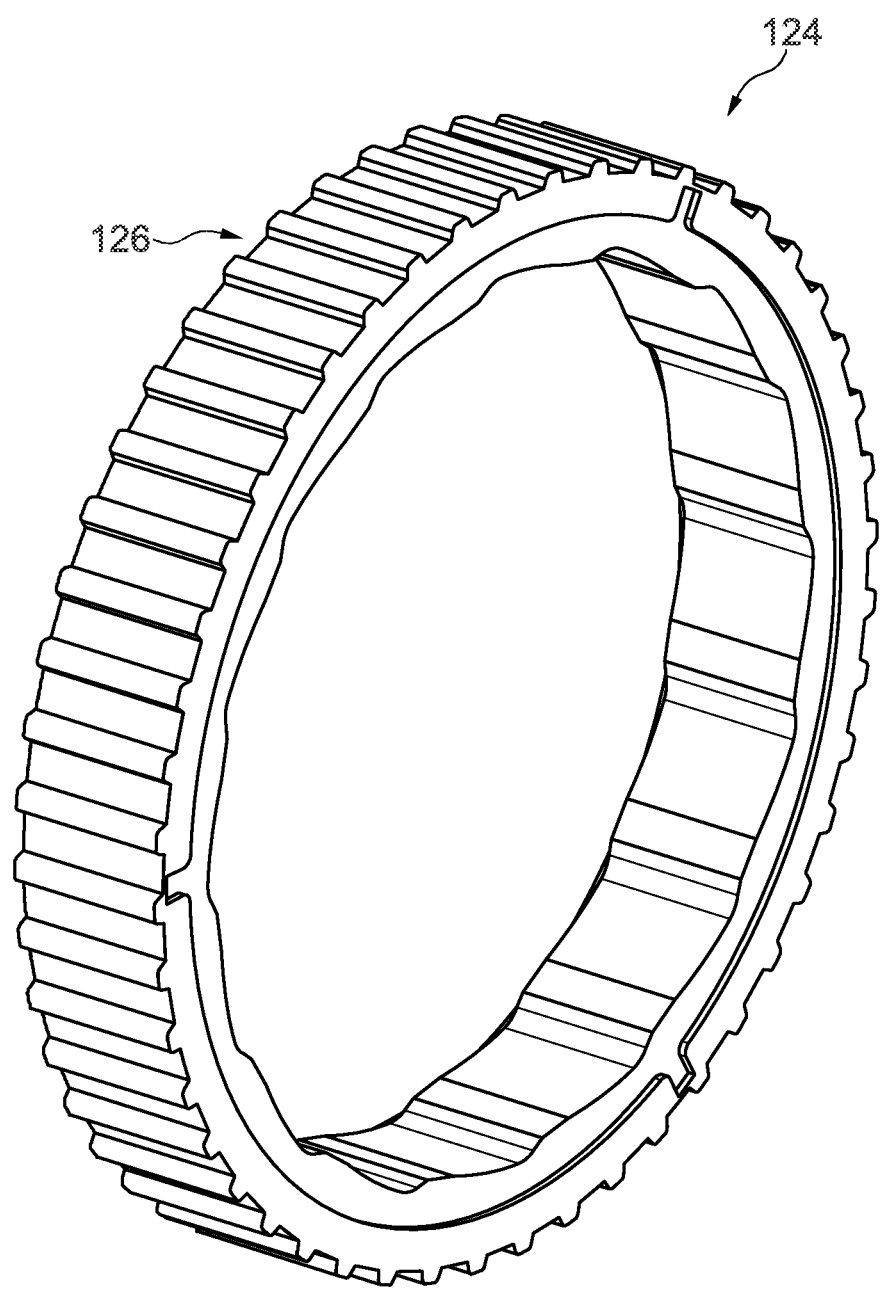
FIG. 6 is a front perspective view of an outer race.
Figure 9:
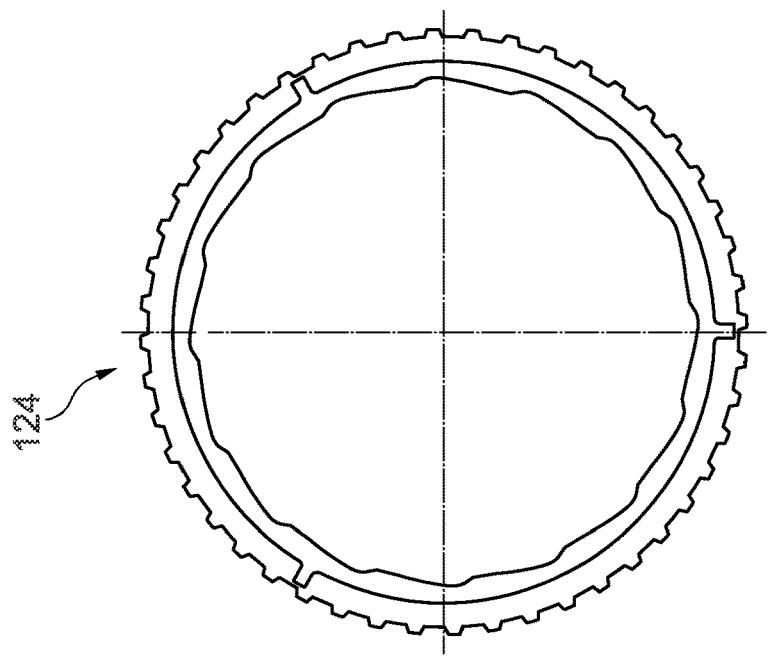
FIG. 9 is a front view of the outer race of FIG. 6.
Figure 8:
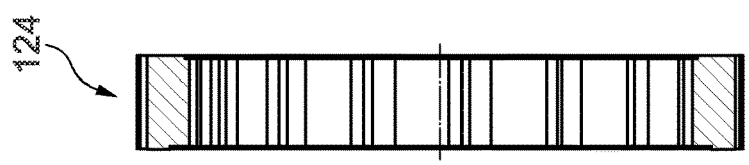
FIG. 8 is a section view of the outer race of FIG. 6 taken generally along line 8-8 in FIG. 7.
Figure 7:
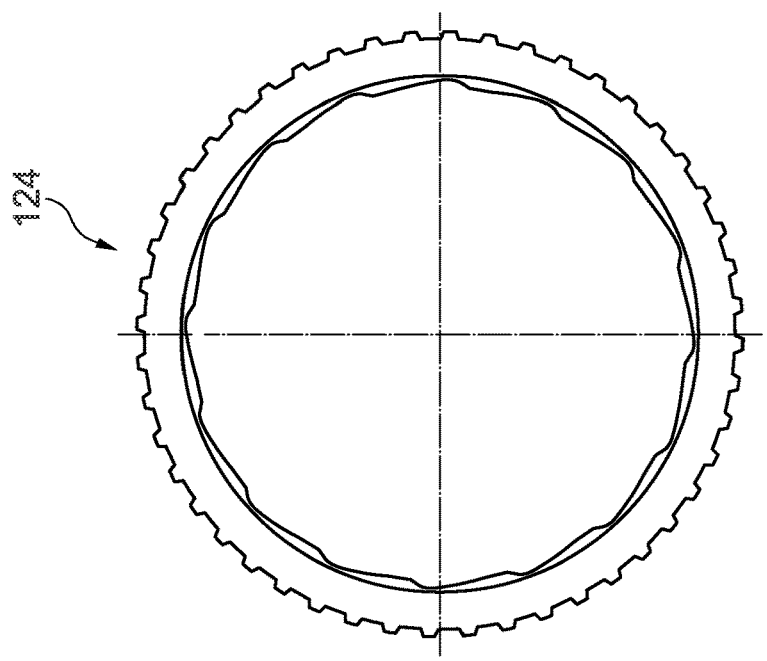
FIG. 7 is a back view of the outer race of FIG. 6.
Figure 10:
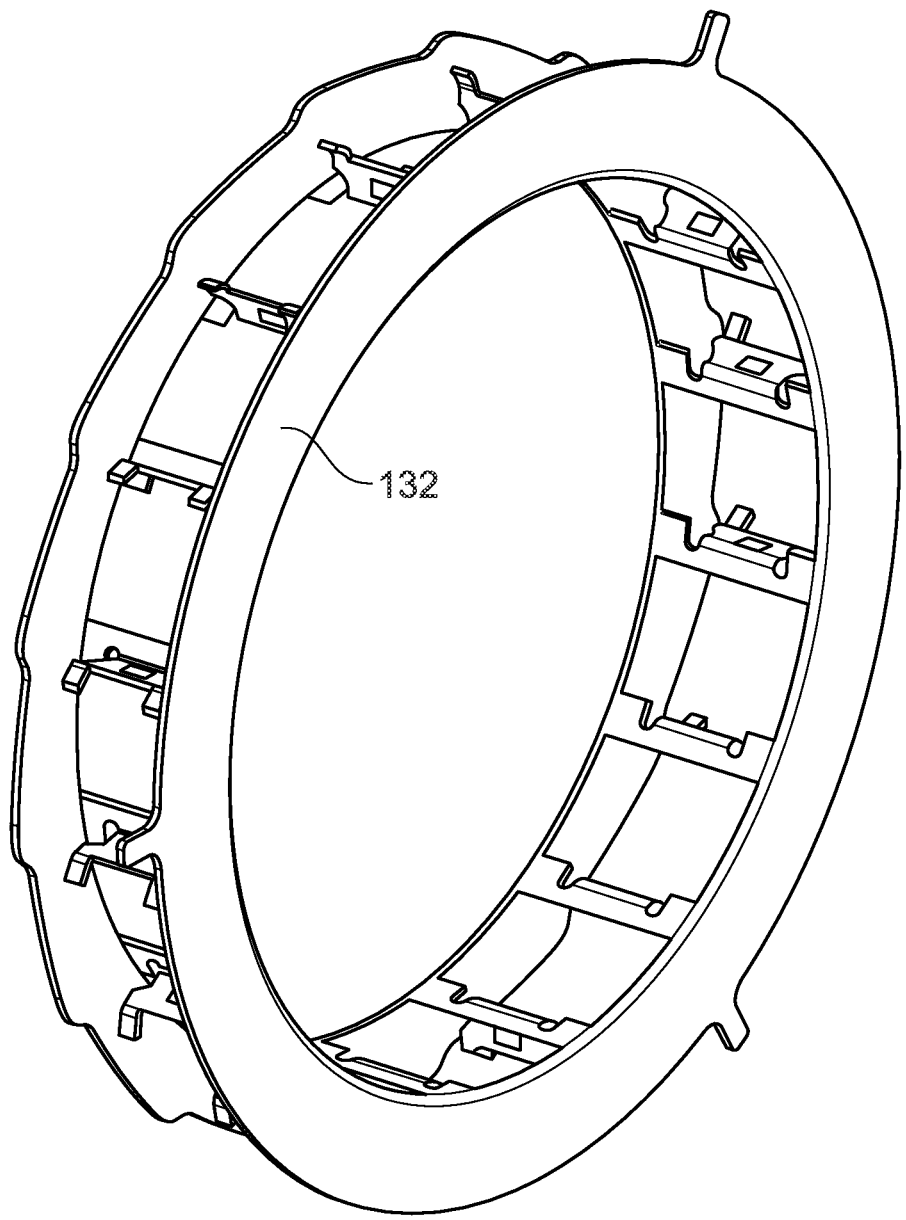
FIG. 10 is a front perspective view of a cage.

The following description is made with reference to FIGS. 1-5. FIG. 1 is a front perspective view of one-way clutch assembly according to an example aspect. FIG. 2 is a back view of the one-way clutch assembly of FIG. 1. FIG. 3 is a section view of the one-way clutch assembly of FIG. 1 taken generally along line 3-3 in FIG. 2. FIG. 4 is a back view of a bearing support plate. FIG. 5 is a side view of the bearing support plate of FIG. 4.

One-way clutch assembly 100 includes housing 102 and bearing support plate 104. Assembly 100 is for a transmission (not shown). Housing 102 includes outer circumferential portion 106 with undulating spline profile 108, inner circumferential portion 110, and radial portion 112 connecting the outer and inner circumferential portions. Bearing support plate 104 is fixed to housing radial portion 112. Inner circumferential portion 110 includes outer surface 114 including spline 116 for engaging a transmission component such as a transmission shaft (not shown), for example.

Bearing support plate 104 includes integral rivet posts 118 for fixing to radial portion 112. That is, rivet posts 118 are protrusions extending from body 120 of support plate 104 through apertures 122 of radial portion 112. Posts 118 may be expanded, or "upset" as is known as a term of art for riveting, to connect the support plate to the radial portion.

One-way clutch assembly 100 includes outer race 124 with outer spline profile 126 engaged with housing outer circumferential portion 106. That is, undulating spline profile 108 and outer spline profile 126 are complementary such that outer race 124 is axially slidable and rotationally fixed with respect to housing 102. In other words, torque received by housing 102 is transmitted to outer race 124, and vice versa. Bearing support plate 104 includes radial wall 127 for axial placement of outer race 124 in housing 102. Alternatively stated, the bearing support plate restricts axial displacement of the outer race within the housing.

One-way clutch assembly 100 includes inner race 128, rollers 130, cage 132, and springs (not shown). The rollers are engaged with inner race 128 and outer race 124 and retained by the cage. Cage 132 is retained within outer race 124 in a manner similar to that shown and described in commonly-assigned U.S. patent application Ser. No. 15/058,555 titled ROLLER ONE WAY CLUTCH CAGE RETENTION, hereby incorporated by reference as if set forth fully herein. Each spring contacts the cage and one of the rollers, urging the rollers away from the cage and into contact the races. Together, these components cooperate to permit free rotation of the inner race relative to the outer race in a first rotational direction and to block rotation of the inner race relative to the outer race in a second rotational direction, opposite of the first rotational direction. The springs urge the rollers into contact with the races such that a ramped surface on the outer race permits sliding between the rollers and the races in the first rotational direction, and clamps the rollers between the two races in the second rotational direction. The cage is provided to retain the rollers and springs for easier assembly.

One way clutch assembly 100 includes hardened side plate 136. Inner race 128 includes a radial wall 138 and the side plate is disposed axially between the inner race radial wall and the rollers. Bearing 140 is disposed radially between inner race 128 and bearing support plate 104. Inner race 128 includes cutting spline 142 for press-fitting onto a transmission component (not shown). That is, spline 142 includes is installed with a force onto a transmission component to ensure a tight connection between one-way clutch assembly 100 and the transmission component. Spline 142 includes chip groove 144 similar to that shown and described in commonly-assigned United States Patent Publication No. 2016/0025143 titled BEARING ASSEMBLY HAVING SPLINE CUTTING INNER RACE, hereby incorporated by reference as if set forth fully herein.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A one-way clutch assembly for a transmission comprising:
    a housing including:
        an outer circumferential portion with an undulating spline profile;
        an inner circumferential portion; and,
        a radial portion connecting the outer and inner circumferential portions;
    a bearing support plate fixed to the housing radial portion;
    an inner race;
    an outer race; and,
    a plurality of rollers engaged with the inner race and the outer race, wherein:
        the outer race comprises a first radial wall disposed radially outside of the plurality of rollers;
        the bearing support plate comprises a second radial wall at least partially radially aligned with the rollers and axially aligned with the first radial wall for axial placement of the outer race in the housing,
        a bearing disposed radially between the inner race and the bearing support plate.

2. The one-way clutch assembly of claim 1 wherein the inner circumferential portion includes an outer surface including a spline for engaging a transmission component.

3. The one-way clutch assembly of claim 1 wherein the bearing support plate includes integral rivet posts for fixing to the radial portion.

4. The one-way clutch assembly of claim 1 wherein the outer race comprises an outer spline profile engaged with the housing outer circumferential portion.

5. The one-way clutch assembly of claim 1 further comprising:
    a cage for retaining the rollers; and,
    a plurality of springs, each spring being in contact with the cage and one of the rollers.

6. The one-way clutch assembly of claim 1 further comprising a hardened side plate, wherein the inner race includes a radial wall and the side plate is disposed axially between the inner race radial wall and the rollers.

7. The one-way clutch assembly of claim 1 wherein the inner race comprises a cutting spline for press-fitting onto a transmission component.

8. A one-way clutch assembly for a transmission comprising:
    a housing including:
        an outer circumferential portion with an undulating spline profile;
        an inner circumferential portion; and,
        a radial portion connecting the outer and inner circumferential portions;
    a bearing support plate fixed to the housing radial portion; and,
    an outer race comprising an outer spline profile engaged with the housing outer circumferential portion such that the outer race is axially slidable and rotationally fixed relative to the housing,
    an inner race; and
    a bearing disposed radially between the inner race and the bearing support plate.

9. The one-way clutch assembly of claim 8 wherein the inner circumferential portion includes an outer surface including a spline for engaging a transmission component.

10. The one-way clutch assembly of claim 8 wherein the bearing support plate includes integral rivet posts for fixing to the radial portion.

11. The one-way clutch assembly of claim 8 wherein the bearing support plate includes a radial wall for axial placement of the outer race in the housing.

12. The one-way clutch assembly of claim 8 further comprising:
    an inner race; and,
    a plurality of rollers engaged with the inner and outer races.

13. The one-way clutch assembly of claim 12 further comprising:
    a cage for retaining the rollers; and,
    a plurality of springs, each spring being in contact with the cage and one of the rollers.

14. The one-way clutch assembly of claim 12 further comprising a hardened side plate, wherein the inner race includes a radial wall and the side plate is disposed axially between the inner race radial wall and the rollers.

15. The one-way clutch assembly of claim 8 further comprising an inner race with a cutting spline for press-fitting onto a transmission component.

* * * * *